(12) United States Patent
Antoine

(10) Patent No.: US 10,382,609 B1
(45) Date of Patent: Aug. 13, 2019

(54) SYSTEM FOR SHARING SOUNDS FROM A SMARTPHONE DURING A VOICE CALL

(71) Applicant: Steve Antoine, Queens Village, NY (US)

(72) Inventor: Steve Antoine, Queens Village, NY (US)

( * ) Notice: Subject to any disclaimer, the term of this patent is extended or adjusted under 35 U.S.C. 154(b) by 28 days.

(21) Appl. No.: 15/629,941

(22) Filed: Jun. 22, 2017

Related U.S. Application Data

(60) Provisional application No. 62/355,512, filed on Jun. 28, 2016.

(51) Int. Cl.
*H04M 1/725* (2006.01)

(52) U.S. Cl.
CPC ..... *H04M 1/7255* (2013.01); *H04M 1/72583* (2013.01); *H04M 2203/256* (2013.01); *H04M 2207/18* (2013.01); *H04M 2250/22* (2013.01)

(58) Field of Classification Search
None
See application file for complete search history.

(56) References Cited

U.S. PATENT DOCUMENTS

| | | | |
|---|---|---|---|
| 6,683,938 B1 | 1/2004 | Henderson | |
| 7,400,905 B1 * | 7/2008 | Malkin | H04M 1/72563 345/168 |
| 8,488,805 B1 | 7/2013 | Santos et al. | |
| 2004/0125965 A1 | 7/2004 | Alberth, Jr. et al. | |
| 2005/0101262 A1 | 5/2005 | Lee et al. | |
| 2007/0021145 A1 * | 1/2007 | Lam | H04M 1/72563 455/556.1 |
| 2007/0041582 A1 | 2/2007 | Lam | |
| 2007/0223668 A1 * | 9/2007 | Blumenfeld | H04L 29/06027 379/201.01 |
| 2016/0026341 A1 * | 1/2016 | Kraev | G06F 3/04817 715/835 |
| 2018/0150202 A1 * | 5/2018 | Zheng | G06F 3/0487 |

FOREIGN PATENT DOCUMENTS

| | | |
|---|---|---|
| WO | WO2004062156 | 7/2004 |
| WO | WO2007024566 | 3/2007 |
| WO | WO2014085868 | 6/2014 |

* cited by examiner

*Primary Examiner* — Muthuswamy G Manoharan
(74) *Attorney, Agent, or Firm* — Goldstein Law Offices, P.C.

(57) ABSTRACT

A system for sharing sounds on a phone call, using a smartphone having a touchscreen display, having a sound library containing a plurality of sounds, and having an app for facilitating the sound sharing functionality, and for initiating a phone call. The app includes a pad controller view which displays a plurality of pads that may each be associated with one of the sounds in the library and will play that sound upon request. The app includes means for associating the sounds with the pads, for editing the sounds associated with the pads, and for adjusting the relative volume of sounds associated with the pads with a mix that may be provided as outgoing audio on the phone call.

2 Claims, 9 Drawing Sheets

SYSTEM FOR SHARING SOUNDS FROM A SMARTPHONE DURING A VOICE CALL

CROSS REFERENCES AND RELATED SUBJECT MATTER

This application is a non-provisional filing of provisional patent application Ser. No. 62/355,512, filed in the United States Patent Office on Jun. 28, 2016, which is incorporated by reference herein in its entirety.

TECHNICAL FIELD

The present disclosure relates generally to a system for sharing sounds during a voice call. More particularly, the present disclosure relates to a system that permits users to selectively add sounds into the audio of a phone call.

BACKGROUND

Smartphones have gone well beyond their expected use of allowing a person to conveniently make phone calls wherever they are. In addition to the endless variation of apps available that occupy them between phone calls, people use their smartphones to share photos, videos, textual comments and messages. Such sharing can often occur during a voice call, but is typically one-way, and not in a collaborative manner.

It is well known that the way that music spreads in popularity is by people sharing it with others. In decades past, people would loan their favorite LP, single, 8-track, cassette tape, or CD to a friend as a way to share their enjoyment of a new favorite song or group. As music distribution moved away from physical distribution and toward electronic distribution, "sharing" sites exploded in popularity and became the way that people shared what they like best. Presently, however, only the direct online purchase of music is available, and with the DRM (digital rights management) data encoded in music files, it has become difficult, if not impossible to even just showcase our favorite music to others.

Also, some of the best new music comes about through collaboration. While lone singer/songwriters do account for some music, the majority of new music is created by more than one person. Those people might not be in the same location, making collaboration difficult. While, as noted previously, it is very easy for people to connect with photos, videos, text, and voice using our smartphones, there are no effective solutions for connecting and collaborating around the creation of music.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system that facilitates a smartphone user in sharing sounds with another, secondary smartphone user, or other call recipient, during a phone call. Accordingly, the present disclosure provides a system that allows sound files present on the smartphone to be converted into an audio program at its original time length (i.e. "played"), added into a mix with other phone audio, and subsequently presented over a network as outgoing audio to the secondary smartphone user where it may be recreated as audio for that user.

It is a further aspect of an example embodiment in the present disclosure to provide both phone controls and sounds controls. Accordingly, an app is provided that has a dialing menu for initiating and controlling the call, and has menus for selecting sounds to be played, adjusting the sounds to be played, and playing the sounds when desired.

It is another aspect of an example embodiment in the present disclosure to provide a system that allows the smartphone user to choose and play any sound contained on their smartphone during the call. Accordingly, a sound library is provided on the smartphone which organizes and facilitates selection and arrangement of the sound files contained therein.

It is yet another aspect of an example embodiment in the present disclosure to provide a system that facilitates preparation and pre-arrangement of sounds to be played in a subsequent phone call. According to an embodiment, a grid of pads are provided on at least one screen of the user interface in a pad controller view. An arrangement view allows selection of a sound from the sound library and associating said sound with one of the pads.

It is a further object of an example embodiment in the present disclosure to provide a system that allows a user to customize each selected sound as desired for use during the call. Accordingly, the system provides a sound edit view, which allows the sound to be auditioned/previewed, and provides other editing options, which may include adjusting volume, setting loops, adjusting speed/tempo, sampling/recording external or internal audio, and time shifting the sound or a portion of the sound.

Accordingly, the present disclosure describes a system for sharing sounds on a phone call, using a smartphone having a touchscreen display, having a sound library containing a plurality of sounds, and having an app for facilitating the sound sharing functionality, and for initiating a phone call. The app includes a pad controller view which displays a plurality of pads that may each be associated with one of the sounds in the library and will play that sound upon request. The app includes means for associating the sounds with the pads, for editing the sounds associated with the pads, and for adjusting the relative volume of sounds associated with the pads with a mix that may be provided as outgoing audio on the phone call.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1:
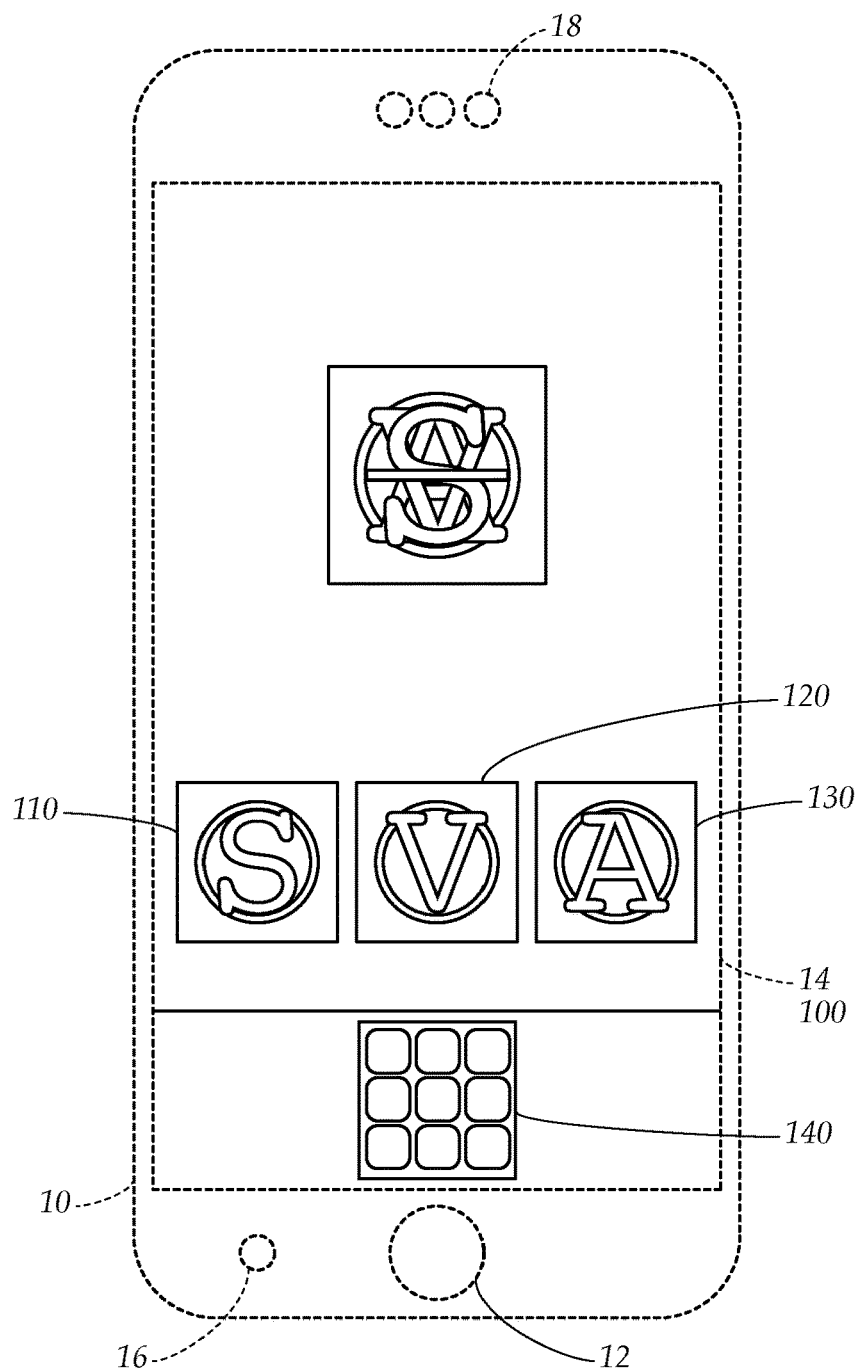
FIG. 1 is an elevational view, showing an example embodiment of a main menu of an app, displayed on a smartphone, in accordance with the system of the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

The present disclosure describes a system for allowing a smartphone user to share sounds during a phone call with another user. The smartphone of the user may be referred to herein as "user smartphone" or simply "smartphone". The other user may have another smartphone, referred to as "secondary smartphone" herein, or according to various embodiments may use any other device capable of receiving a phone call from the smartphone. The system may be implemented as an app on the smartphone, providing the functionality described herein using existing hardware as provided by the smartphone manufacturer. "Smartphone" as defined herein may refer to various portable electronic devices having both voice communication functionality, as well as being programmable and having the ability to host applications that provide additional functionality, and a user interface that allows the user to access both the voice communication functionality and the additional functionality. "Sound" as described herein may be a momentary sound such as a snare drum or hand clap, and may also be an elaborate sound such as a beat loop, ring tone, voice memo, or an entire song. The sounds may be contained in a sound library, which includes a plurality of sounds stored as files in digital form by any suitable format, including MP3, AAC, WAV, etc., stored within the device or indexed to be immediately available thereto. The sounds are illustrated within the drawing figures herein as "Sound A", "Sound B", etc. to indicate specific sounds from the sound library that have been selected for various portions of the functionality described hereinbelow. Such names might otherwise be displayed as a song title and recording artist, sound filename, or other descriptive and identifying text or graphics. "Phone call", as defined herein may refer to a conventional telephone call, made to a standard phone number over the conventional, public switched telephone network (PSTN), and may also refer to any two-way voice communication connection that occurs over other types of networks and using any other protocol, including voice over IP (VoIP) and others presently available and which may be subsequently created.

FIG. 1 illustrates a smartphone 10, having a user interface 12, that includes a touchscreen display 14, a microphone 16 for obtaining microphone audio, and a speaker 18. Displayed on the touchscreen display 14 in FIG. 1 is a main menu 100. The main menu has submenu icons that provide access to several submenus, including a sound menu icon 110, a volume menu icon 120, an arrangement menu icon 130, and dialing menu icon 140.

Figure 9:
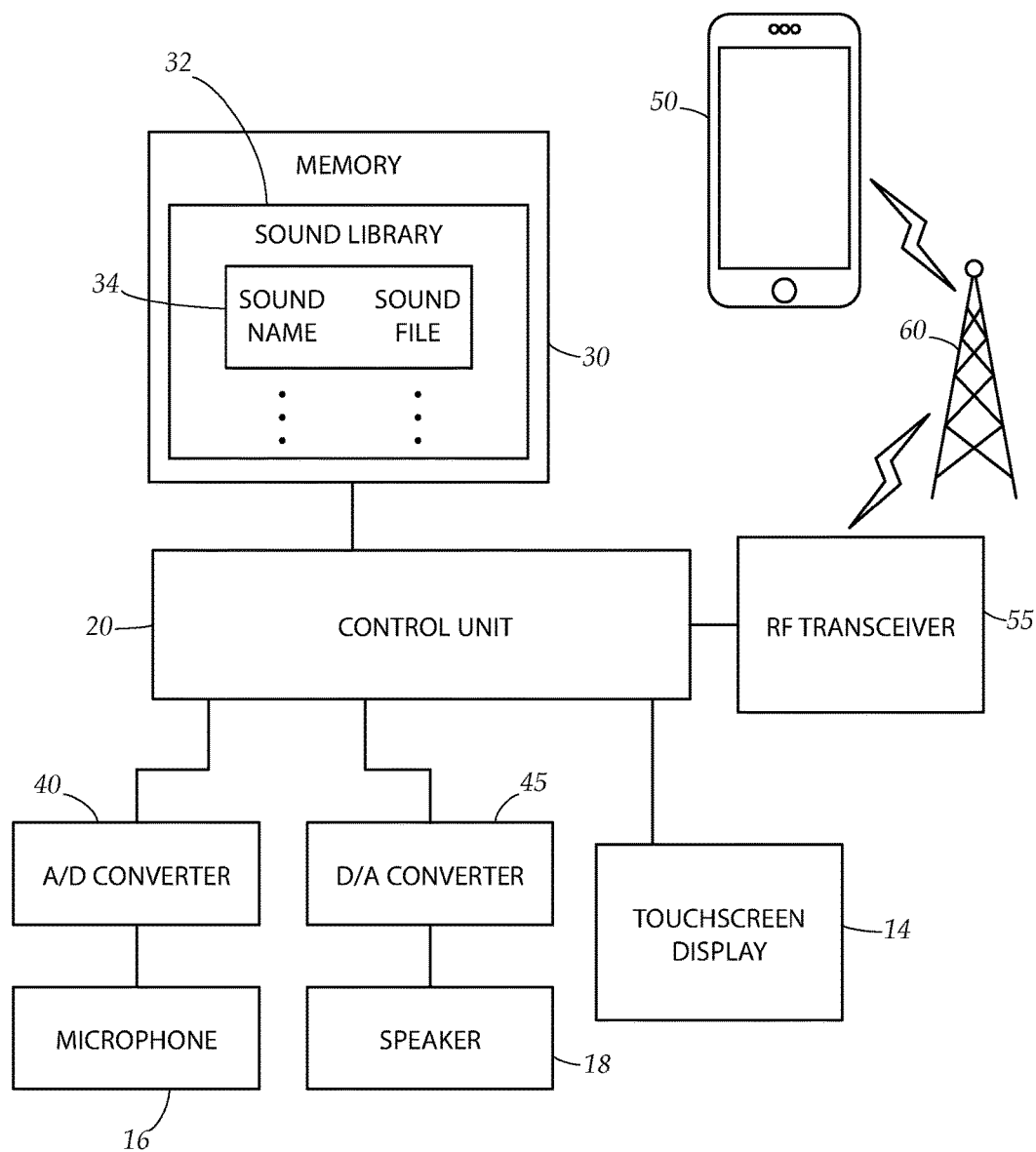
FIG. 9 is a block diagram, illustrating functional interconnection of various components of the system described herein.

FIG. 9 illustrates a basic architecture of the smartphone 10, as well as its interconnection with a secondary smartphone 50, through a telephone network 60. In particular, the smartphone 10 has a control unit 20 that may include any suitable microprocessor or microcontroller device that is programmable to provide the functionality described herein. The smartphone also has a memory unit 30 that includes a sound library 32 that includes a plurality of sounds 34. Each sound includes a sound name, and a sound file that represents/includes one or more digitized version(s) of the sound in any suitable format(s). The smartphone includes any suitable hardware for receiving, creating, and processing audio, such as an analog to digital (A/D) converter 40 that receives electrical audio signals from the microphone 16, headphone jack, or other audio inputs on the smartphone 10 and digitizes them for use by the control unit 20; and a digital to audio converter 45 that allows the control unit 20 to generate audio from digitized sound files, using the speaker 18 or any other suitable output device. The touchscreen display 14 allows the control unit 20 to communicate with the user, by providing a visual user interface that provides the functionality described herein, including displaying options and allowing the user to select from such options. An RF transceiver 55 allows the smartphone 10 to communicate with the telephone network 60, including initiating and receiving calls, as well as transmitting and receiving digitized audio, in a manner well familiar to those possessing ordinary skill in the art.

Figure 2:
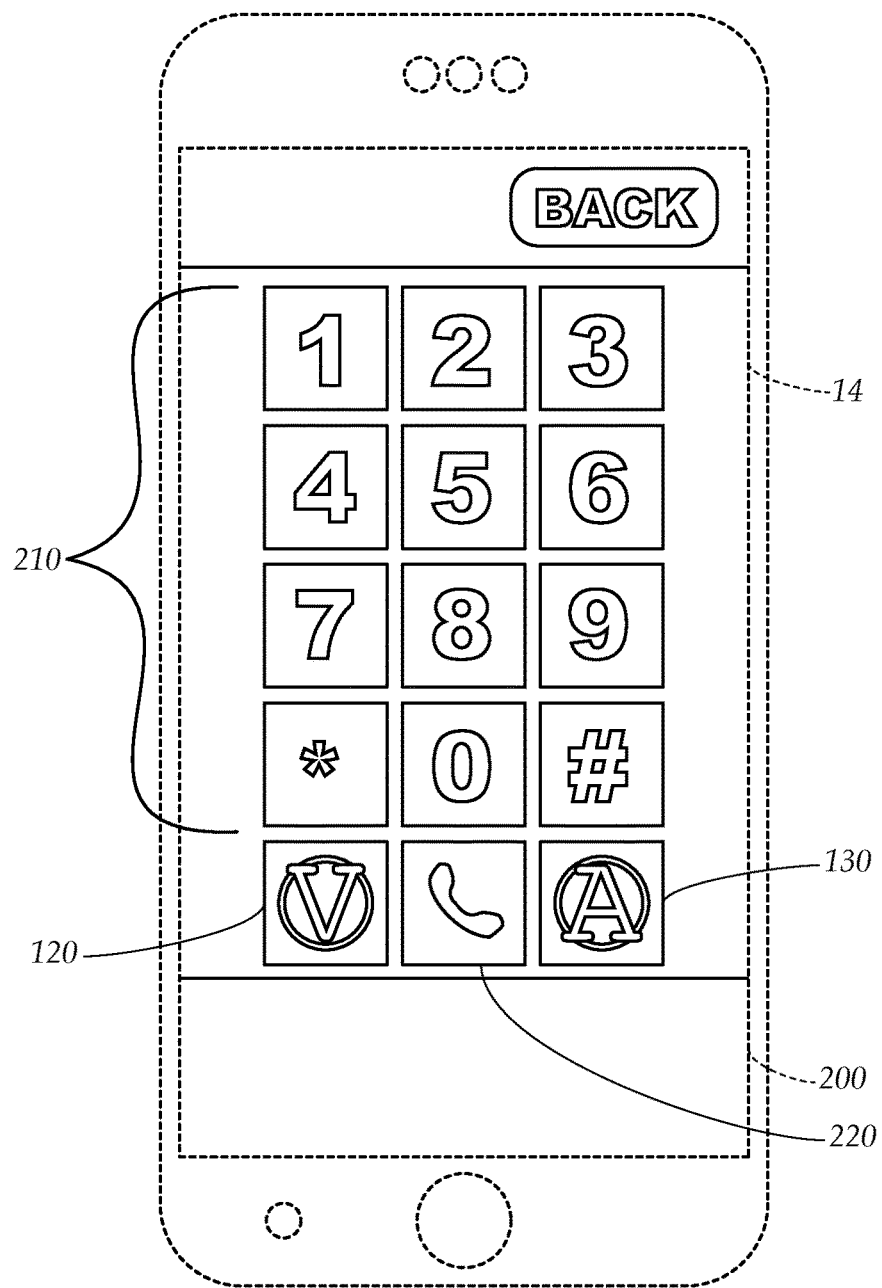
FIG. 2 is an elevational view, showing an example embodiment of a dialing menu, in accordance with the system of the present disclosure.

Referring now to FIG. 2, a dialing menu 200 is indicated on the touchscreen display 14. The dialing menu 200 includes a keypad portion 210 that includes iconic numeric buttons for numerals "0" through "9", as well as an asterisk and hash button. In addition, the volume menu icon 120 and arrangement menu icon 130 is provided on the dialing menu 200. A call button 220 may be used to initiate a call.

Figure 3:
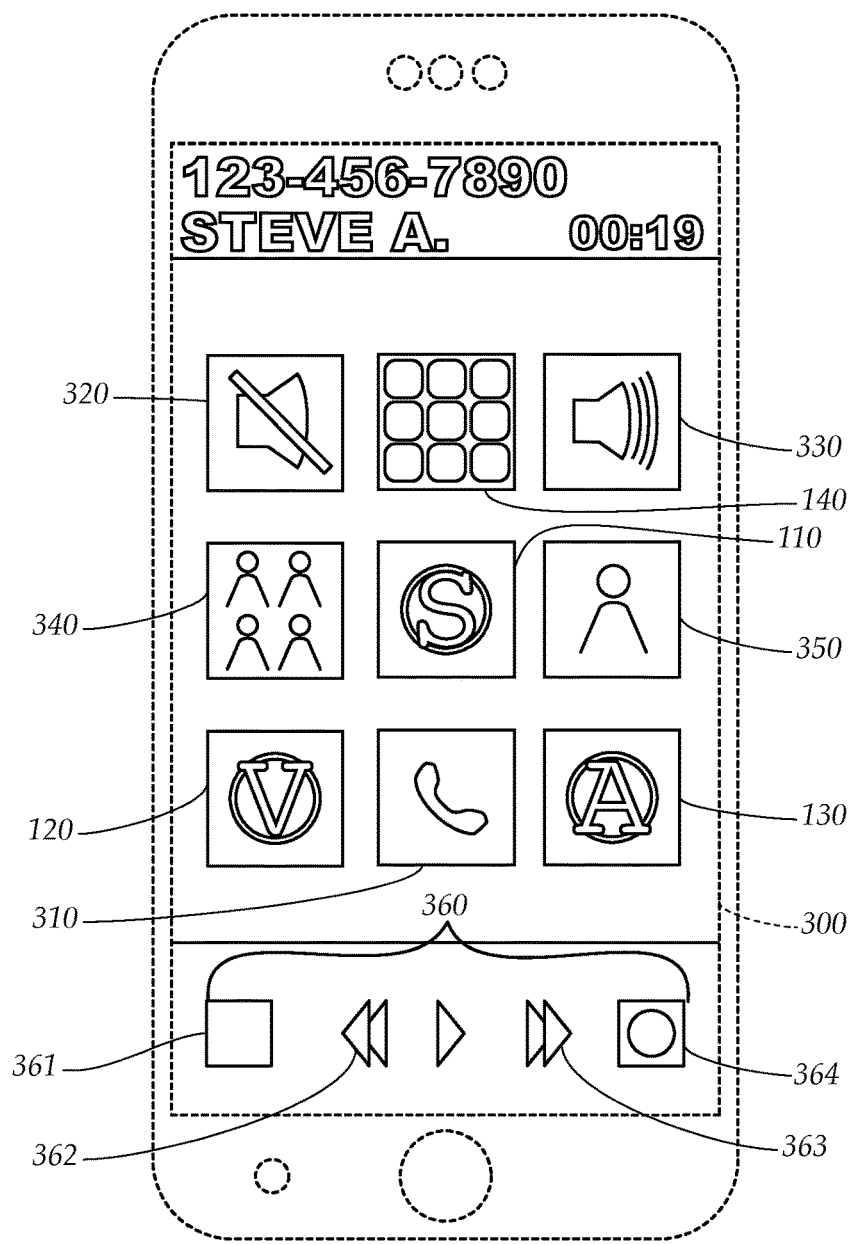
FIG. 3 is an elevational view, showing an example embodiment of an in-call menu, in accordance with the system of the present disclosure.

When a phone call is initiated to another smartphone device, the in-call menu 300 is displayed, as indicated in FIG. 3. The in-call menu 300 provides access to the dialing menu by having the dialing menu icon 140 thereon, and also includes the sound menu icon 110, the volume menu icon 120, and the arrangement menu icon 130. During the call, microphone audio is obtained from the microphone 16 (FIG. 1), for creating call audio that is digitized, formed into data packets, and transmitted to the other smartphone device by RF transmission, in a conventional way. The call may be terminated with a call end button 310. Additional functionality is provided on this menu with a mute icon 320 and a speakerphone icon 330, a conference call add icon 340, and a contacts icon 350 for accessing the user's contacts. To facilitate playing a selected sound during the phone call, transport controls 360 are provided, including a stop icon 361, rewind icon 362, fast forward icon 363, and a record icon 364.

Figure 7:
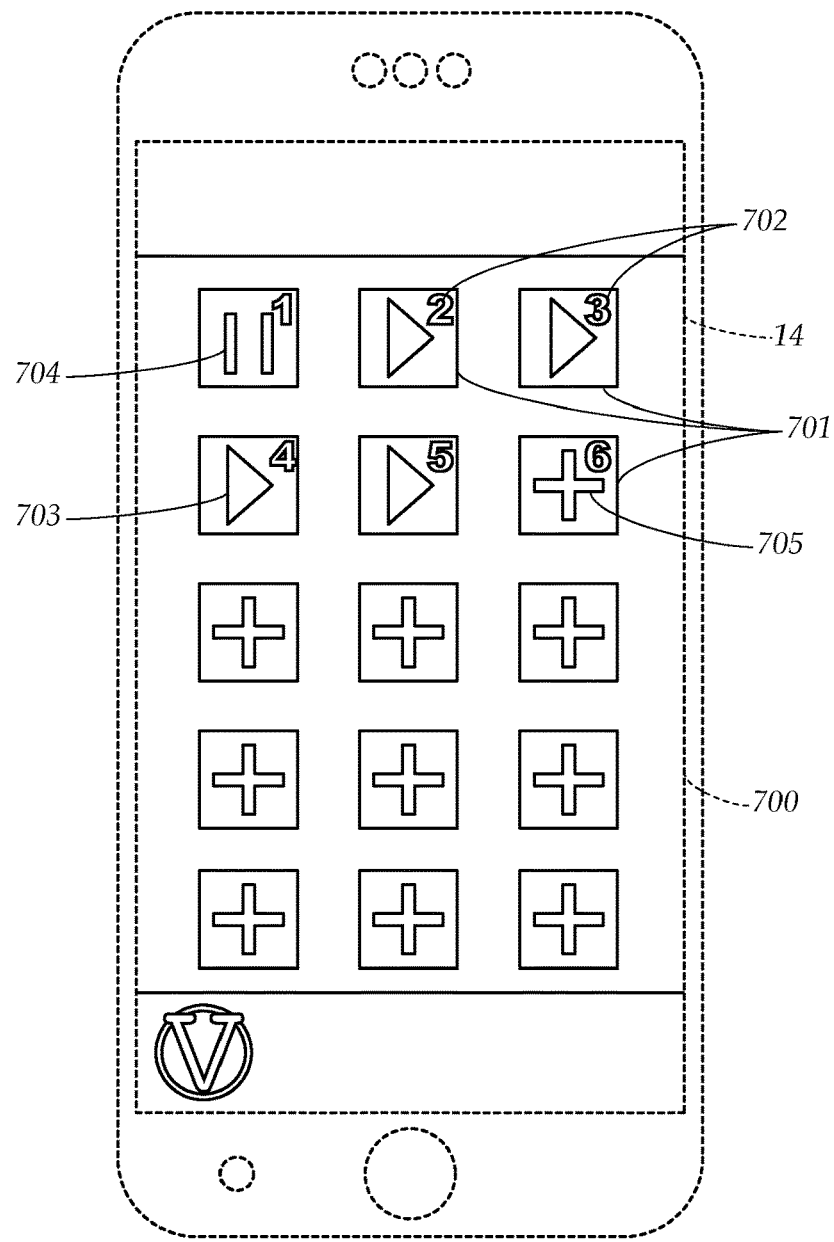
FIG. 7 is an elevational view, showing an example embodiment of a pad controller view, showing numbered pads that allow access to previously selected sounds, in accordance with the system of the present disclosure.

Referring now to FIG. 7, a pad controller view 700 is shown, wherein a plurality of pads 701 are illustrated on the touchscreen display 14. Each pad 701 has a unique pad number 702, and may be associated with an individual sound, and graphically indicates its status as such. In particular, when associated with a sound, the pad may display a triangular play icon 703, indicating that a sound is associated with that pad and may be played by pressing it; it may display a pause icon 704, indicating the associated with that pad is playing and may be paused/stopped by pressing it. When a sound is not associated with one of the pads, it may show an add icon 705, that can be visually represented as a plus symbol. In the embodiment shown as an example herein, fifteen pads 701 are provided, in a grid of three columns and five rows. Optionally, additional grid(s) of pad controllers may be accessible through tabs or other means to provide further pads to the user.

Within the in-call menu 300 of FIG. 3, pressing the sound menu icon 110 will immediately bring up the pad controller view 700 of FIG. 7. From FIG. 7, a quick vertical swipe, other gesture or touch may be used to bring up an arrangement view 400, as indicated in FIG. 4.

Figure 4:
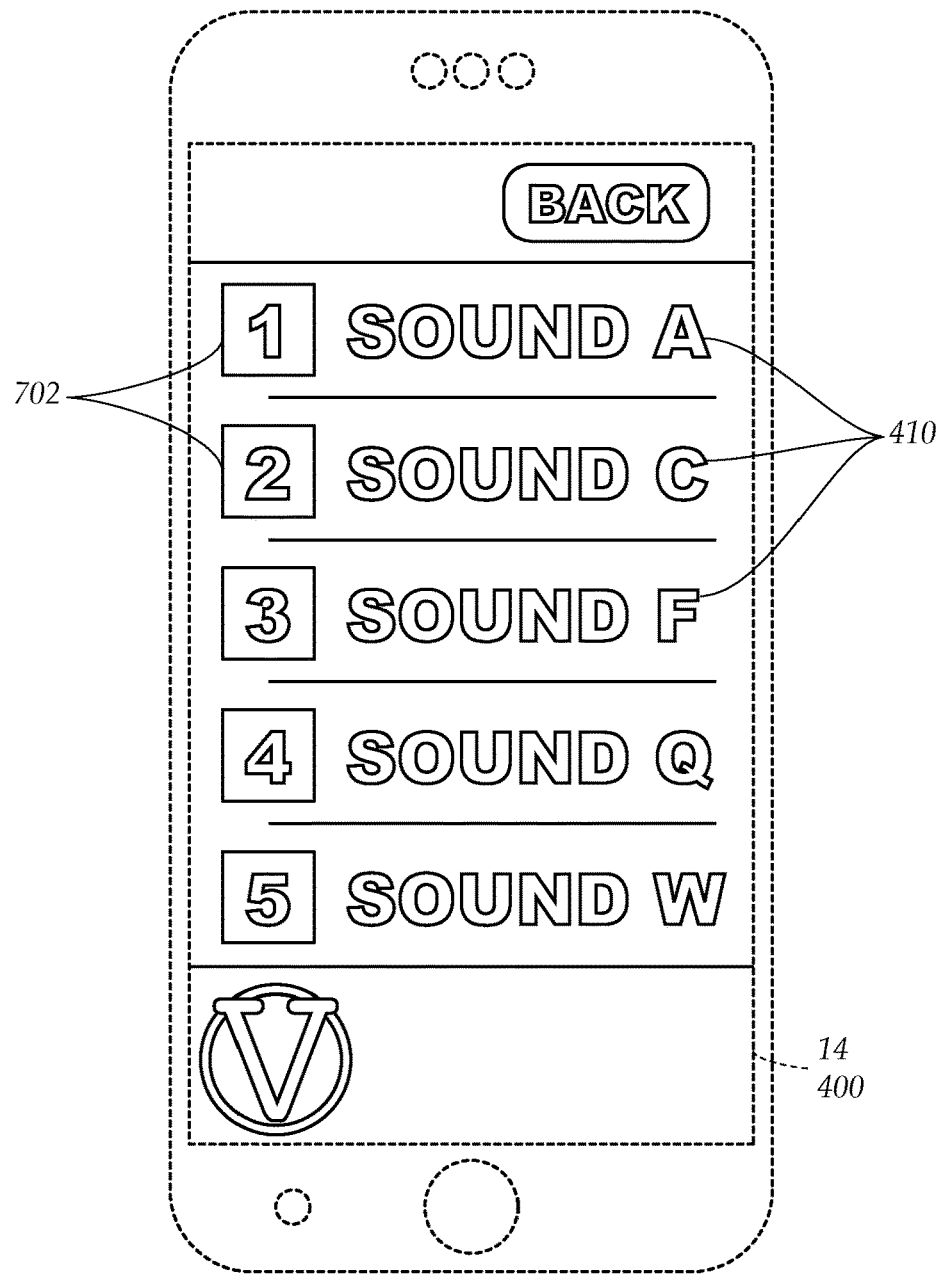
FIG. 4 is an elevational view, showing an example embodiment of an arrangement view, in accordance with the system of the present disclosure.

The arrangement view 400, displayed on the touchscreen 14 in FIG. 4, lists each pad number 702, along with a sound name 410 associated with that pad number. In the example indicated, the arrangement view 400 displays five pad numbers 702 and their associated sound names 410. Thus, the arrangement view is preferably configured to scroll to show the pad numbers 702 and associated sound names 410 for all of the pads 701 provided on the pad controller view 700 (FIG. 7).

Figure 5:
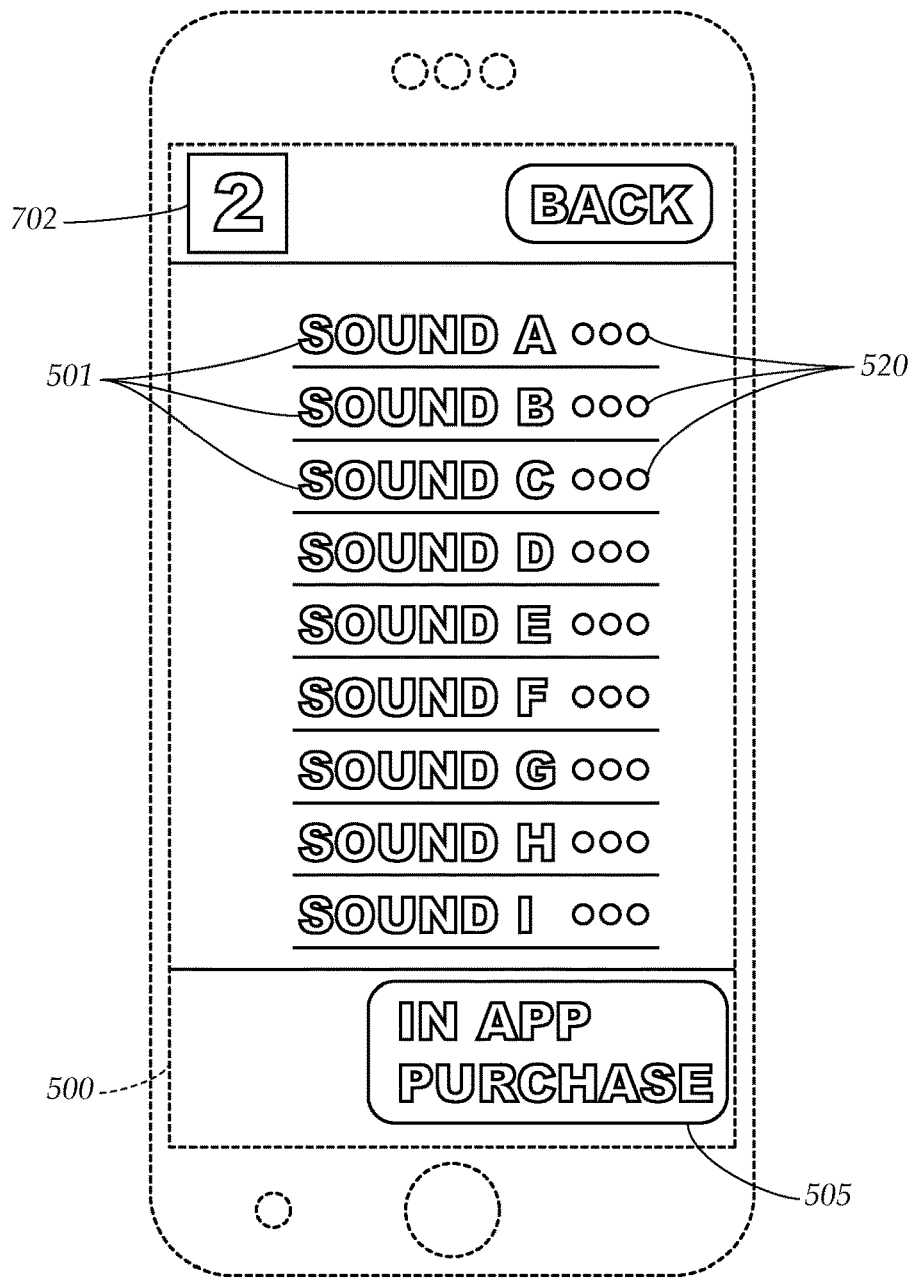
FIG. 5 is an elevational view, showing an example embodiment of library view, for displaying and sounds within a sound library, in accordance with the system of the present disclosure.

Pressing any of the pad numbers 702 on the arrangement view 400 will bring up a library view 500 as indicated in FIG. 5. The library view lists all sounds in the sound library by their sound name 501, and permits the user to select one of the sounds for the pad number 702 pressed to pull up the library view 500, which may optionally be displayed on the library view at the top of the screen. In the example shown, a "2" is displayed at the top of the screen to indicate that this library view presently allows selection of a sound for pad number 702 bearing the icon "2". Selecting the sound name 501 of one of the sounds will then associate that sound with said pad number 702. The library view is also preferably configured to scroll so as to permit the display and selection of any sound from a large sound library. The library view may also allow in-app purchases, by selecting an in-app purchase icon 505, that would then provide connection to an e-commerce solution for facilitating browsing, selection, and purchase from among innumerable possible sounds, that would then be downloaded and added to the sound library.

Figure 6:
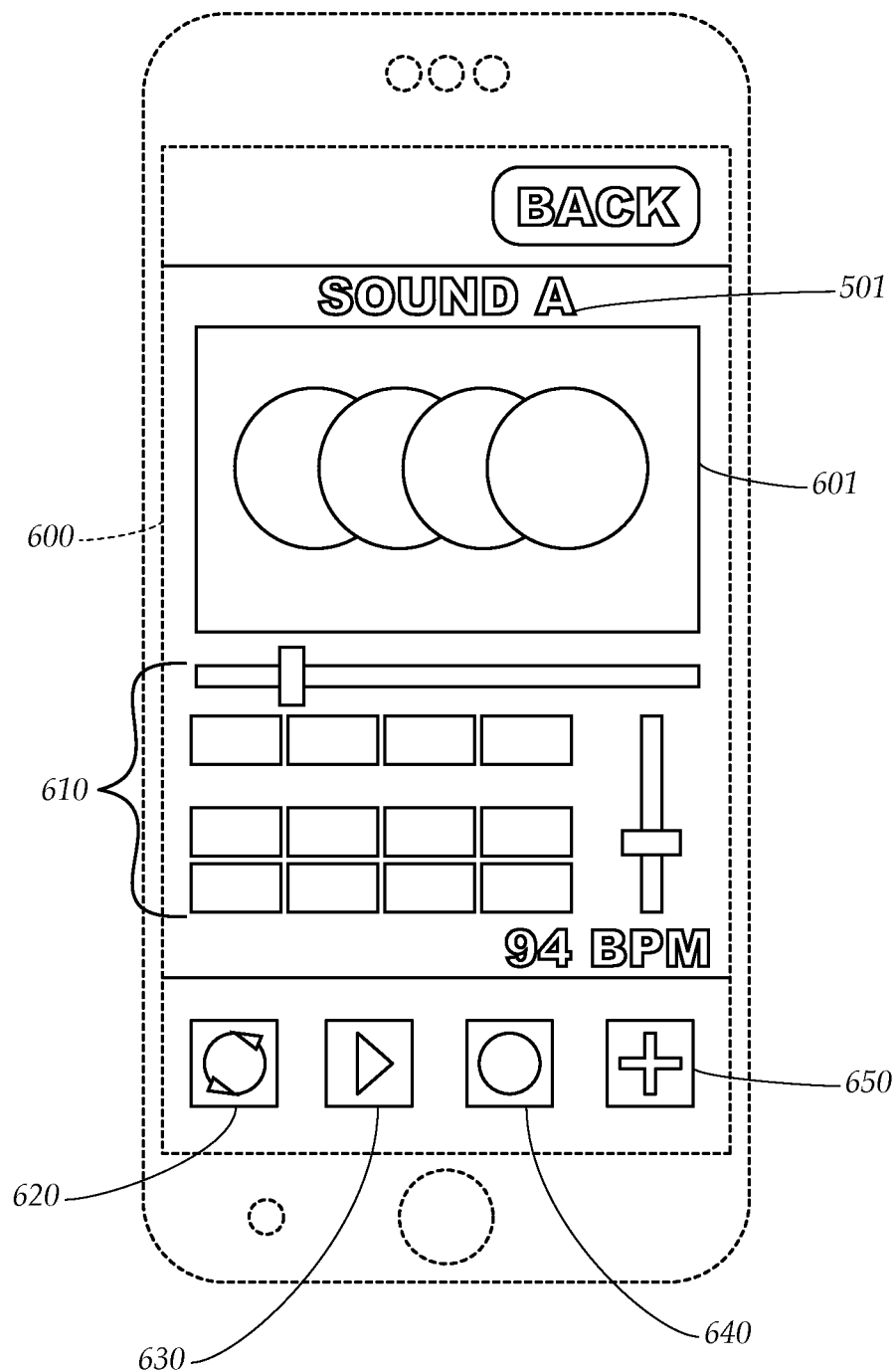
FIG. 6 is an elevational view, showing an example embodiment of a sound edit view, for allowing a selected sound to be edited, in accordance with the system of the present disclosure.

An edit options icon 520 is next to the sound name 501 of each sound, When pressed it will bring up a sound edit view 600 (FIG. 6). The sound edit view 600 displays the sound name 501 that has been selected for editing, and may display a graphical representation 601 of that sound, such as album art when the selected sound is a song, or may display an appropriate graphical image when the selected sound is a simple sound, such as a snare drum or hand clap. Editing controls 610 are provided that allow non-destructive editing of the selected sound, such that any editing performed does not alter the original file in the sound library, but alters how it is used when accessed through its associated pad. The editing controls 610 may include looping controls, cue controls, timing/positioning of the sound such as by using a slider or by dragging to a timeline or beat grid, speed or BPM (beats per minute), and volume. In addition, a repeat icon 620, play icon 630, and record icon 640 may be used for previewing and recording or sampling the sound while editing. An insert icon 650 saves the edits in association with the sound and brings the user back to the arrangement view 400. The edits may be saved as a series of edit settings that are applied in real time to the original audio file during performance, or may be rendered, such that a modified audio file is created that is available for immediate use during performance.

Figure 8:
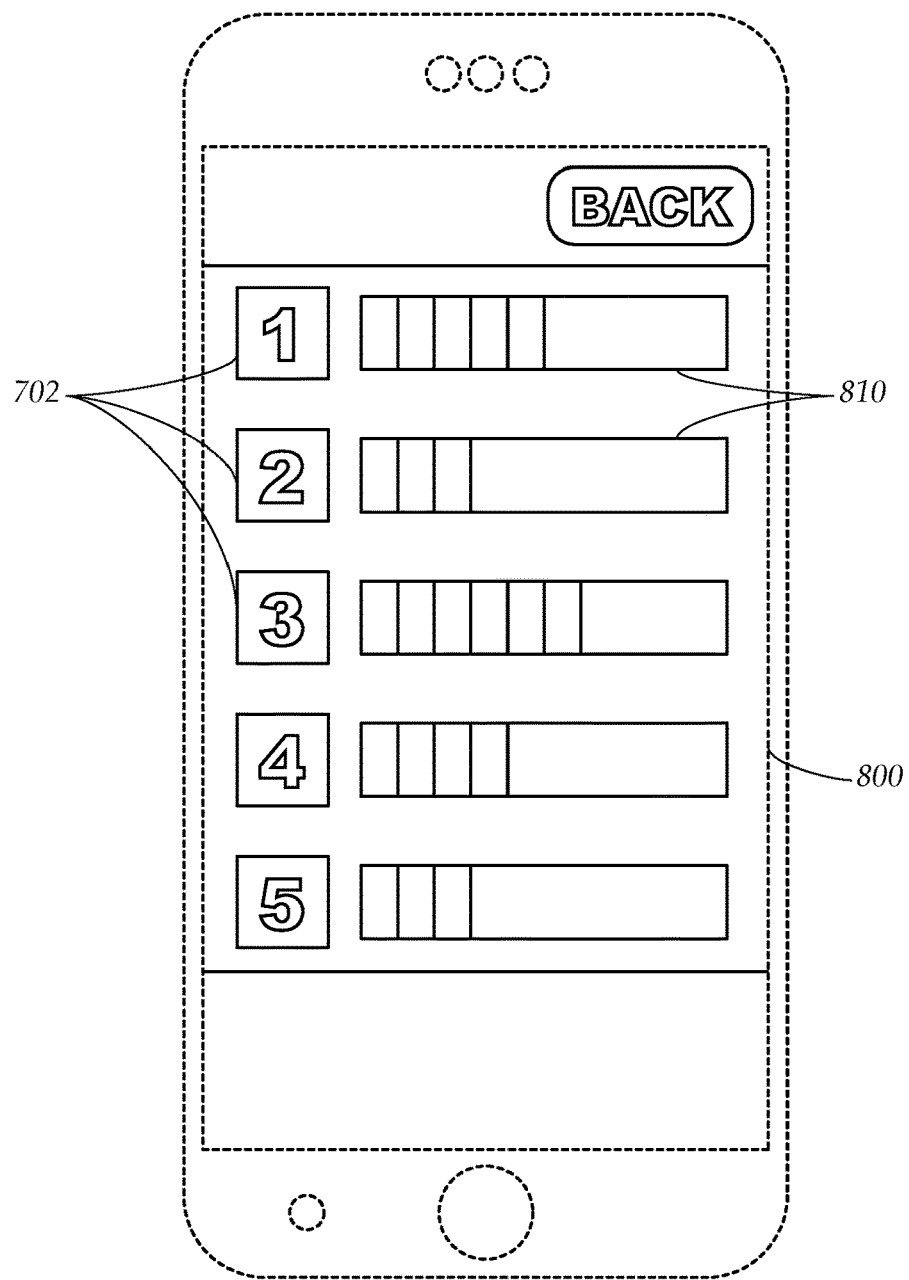
FIG. 8 is an elevational view, showing an example embodiment of a volume menu, for allowing adjustment of set volume levels for selected sounds, in accordance with the system of the present disclosure.

Pressing the volume menu icon 120 from the main menu 100, the arrangement view 400, or the pad controller view 700, brings up a volume menu 800 as illustrated in FIG. 8. The volume menu 800 displays the pad numbers 702, and a volume indicator 810 next to each of said pad numbers 702. The volume indicator 810 may function as both an indicator of a set volume level for the sound associated with that pad number 702, and as a slider that can alter said set volume level by the user moving the volume indicator on the touchscreen display. The set volume level may be used by a virtual mixer, preferably provided as a software algorithm within the app, for creating a mix between various sounds that are performed, auditioned/previewed, or performable by activating the individual pads, as well as mixing microphone audio. The mix is provided as the call audio, which is outgoing audio digitally transmitted by the smartphone on the phone call and may also be recorded by the app. In addition the mixer can be set to alter the relative volumes of other available audio within the call, including microphone audio obtained from the microphone, the incoming audio on the phone call from other user(s), as well as any attached or remote sound sources that may be added to the mix.

Additional functionality may be provided to further facilitate collaboration. For example, the app may be configured to access additional audio programs, such as present from a headphone jack or other audio input on the smartphone, as well as remote hardware connected to the smartphone by a network, and add such audio programs into the mix that is provided on the phone call and/or recorded by the system. Further, the system may be configured to provide additional functionality when the user is connected on a phone call with another smartphone user—or secondary smartphone user— that also has the app running on the smartphone. When two or more such users are connected using the app, additional data may be transferred between their smartphones by the app, to provide better synchronization between the apps and facilitate enhanced collaboration between the users.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a system for playing sounds from a smartphone during a telephone call. The disclosure is illustrated by example in the drawing figures, and throughout the written description. It should be understood that numerous variations are possible, while adhering to the inventive concept. Such variations are contemplated as being a part of the present disclosure.

What is claimed is:

1. A smartphone sound sharing method, for collaboratively sharing sounds between a user smartphone employed by a user and a secondary smartphone employed by a second user, the smartphone and secondary smartphone each having a touchscreen display, a sound library containing digitized sounds each having a sound name, and a microphone, comprising the steps of:

displaying a main menu having a dial menu icon, a sound menu icon, an arrangement menu icon, and a volume menu icon;

initiating a phone call to the secondary smartphone using the user smartphone, and displaying a dialing menu when the dialing menu icon is pressed, the dialing menu having a keypad, a call button, and the arrangement menu icon;

displaying a plurality of pads on the touchscreen display of the user smartphone or the secondary smartphone as a pad controller view when the sound menu icon is pressed, each of the pads having a unique pad number, one of said pads associated with one of the sounds in the sound library, displaying a triangular play icon and its unique pad number on any pad that has been previously associated with one of the sounds in the sound library, displaying a pause icon and its unique pad number on any pad that is currently playing, and displaying a plus icon on any pad that has not been previously associated with one of the sounds in the sound library;

displaying a library view when one of the pads that has not been previously associated with one of the sounds in the sound library is pressed and allowing the user or secondary user to associate one of the sounds from the sound library with said pad using the touchscreen display;

displaying an arrangement view and displaying the pad numbers in list form with the sound name of the sound associated with each pad listed alongside its associated pad number, by pressing the arrangement menu icon, or vertically swiping on the touchscreen display while the pad controller view is displayed;

displaying an edit menu, for allowing the user or second user to edit one of the sounds in the sound library, by displaying said sound name, displaying edit controls that include looping controls, cue controls, and displaying an insert icon;

editing the sound by the user or second user pressing the edit controls;

saving the edits in association with the sound as a series of edit settings that are applied in real time when the sound is played without altering the original sound in the sound library, and displaying the arrangement view in response to pressing the insert icon on the touchscreen display by the user or the second user;

displaying a volume menu when the volume menu icon is pressed, by displaying each of the pad numbers and a volume indicator alongside said pad number that indicates a set volume level for said pad number, and altering the set volume level associated with one of said pad numbers by moving the volume indicator on the touchscreen display by the user or the second user;

receiving microphone audio by receiving sound by the user smartphone microphone;

generating call audio by playing one of the sounds from the sound library by the user pressing the pad associated with the sound using the touchscreen display of the user smartphone, and mixing the microphone audio with said sound from the sound library;

transmitting the call audio from the user smartphone as outgoing audio to the secondary smartphone;

receiving the outgoing audio as incoming audio by the secondary smartphone;

generating collaboratively created audio by playing one of the sounds from the secondary sound library by the second user pressing the pad associated with the sound using the touchscreen display of the secondary smartphone, and mixing the incoming audio with said sound from the secondary smartphone sound library; and transmitting the collaboratively created audio from the secondary smartphone to the user smartphone.

2. A smartphone sound sharing method for collaboratively sharing and editing sounds, between a user smartphone employed by a user and a secondary smartphone employed by a second user, the smartphone and secondary smartphone each having a touchscreen display, a sound library containing digitized sounds each having a sound name, and a microphone, comprising the steps of:

displaying a main menu having a dial menu icon, a sound menu icon, an arrangement menu icon, and a volume menu icon;

initiating a phone call to the secondary smartphone using the user smartphone by displaying a dialing menu when the dial menu icon is pressed, the dial menu having a keypad, a call button, and the arrangement menu icon;

displaying a pad controller view on the touchscreen display of the user smartphone or the secondary smartphone when the sound menu icon is pressed, the pad controller view having a plurality of pads each having a unique number, each pad assignable to one of the sounds in the sound library, at least one of the pads associated to one of the sounds in the sound library, displaying a triangular play icon on any pad that has been previously associated with one of the sounds in the sound library, displaying a pause icon and its unique pad number on any pad that is currently playing, and displaying a plus icon on any pad that has not been previously associated with one of the sounds in the sound library;

displaying a library view by pressing one of the pads that has not been previously associated with one of the sounds in the sound library and then associating one of the sounds from the sound library with said pad using the touchscreen display;

displaying an arrangement view and displaying the pad numbers in list form with the sound name of the sound associated with each pad listed alongside its associated pad number, by pressing the arrangement menu icon, or vertically swiping on the touchscreen display while the pad controller view is displayed;

displaying an edit menu, for allowing the user or the second user to edit one of the sounds in the sound library, by displaying said sound name, displaying edit controls that include looping controls, cue controls, and displaying an insert icon;

editing the sound by the user or the second user pressing the edit controls;

saving the edits in association with the sound as a series of edit settings that are applied in real time when the sound is played without altering the original sound in the sound library, and displaying the arrangement view in response to pressing the insert icon on the touchscreen display by the user or the second user;

displaying a volume menu when the volume menu icon is pressed, by displaying each of the pad numbers and a volume indicator alongside said pad number that indicates a set volume level for said pad number, and altering the set volume level associated with one of said pad numbers by moving the volume indicator on the touchscreen display by the user or the second user;

receiving microphone audio by receiving sound by the user smartphone microphone;

generating call audio by mixing the microphone audio to include a sound from the sound library associated with one of the pads when the user presses said pad;

transmitting the call audio from the user smartphone to the secondary smartphone;

receiving the outgoing audio as incoming audio by the secondary smartphone;

generating collaboratively created audio by mixing the incoming audio with one of the sounds from the sound library associated with one of the pads when the second user presses said pad;

transmitting the collaboratively created audio from the secondary smartphone to the user smartphone;

displaying a record icon on the touchscreen display, and recording the call audio after the record icon is pressed; and receiving the collaboratively created audio by the user smartphone, and recording the collaboratively created audio and mixing it with the edited sound.

* * * * *